(12) United States Patent
Akazawa et al.

(10) Patent No.: US 11,995,359 B2
(45) Date of Patent: May 28, 2024

(54) IMAGE FORMING APPARATUS WITH TOUCH AND TOUCHLESS INPUT PORTION

(71) Applicant: CANON KABUSHIKI KAISHA, Tokyo (JP)

(72) Inventors: Minoru Akazawa, Chiba (JP); Takuya Uemura, Chiba (JP); Kenji Fukushi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/064,509

(22) Filed: Dec. 12, 2022

(65) Prior Publication Data

US 2023/0185491 A1    Jun. 15, 2023

(30) Foreign Application Priority Data

Dec. 14, 2021 (JP) .................... 2021-202664
Jan. 5, 2022 (JP) .................... 2022-000737
Jan. 5, 2022 (JP) .................... 2022-000738
Nov. 4, 2022 (JP) .................... 2022-177152

(51) Int. Cl.
  *G06F 3/048*   (2013.01)
  *G06F 3/12*   (2006.01)

(52) U.S. Cl.
  CPC .......... *G06F 3/1203* (2013.01); *G06F 3/1253* (2013.01); *G06F 3/1279* (2013.01)

(58) Field of Classification Search
  CPC .... G06F 3/1253; G06F 3/1279; G06F 3/0488; G06F 3/048; G06F 3/017; G06F 3/016
  USPC ......... 358/1.15, 1.13; 399/81; 715/700, 863, 715/702
  See application file for complete search history.

(56) References Cited

U.S. PATENT DOCUMENTS

| | | | |
|---|---|---|---|
| 2015/0089419 A1* | 3/2015 | Hwang ................. | G06F 3/0482 715/768 |
| 2018/0246636 A1* | 8/2018 | Horiike ............. | H04N 1/00482 |
| 2020/0319750 A1 | 10/2020 | Murayama | |
| 2022/0382449 A1* | 12/2022 | Morita .................. | G06F 3/0488 |

* cited by examiner

*Primary Examiner* — Jamares Q Washington
(74) *Attorney, Agent, or Firm* — Canon U.S.A., Inc., IP Division

(57) ABSTRACT

An image forming apparatus includes an image forming portion that forms an image on a recording medium, a display portion that displays information regarding image forming with the image forming portion, a memory storing instructions, and a controller, which executes the instructions, that detects a position of an instruction portion in contact with a surface of the display portion and generate first input information indicating the detected position of the instruction portion, and detects a position of the instruction portion at a location a predetermined distance away from the surface in a direction orthogonal to the surface and generate second input information indicating the detected position, and transitions the image forming apparatus into a first input mode for generating the first input information without generating the second input information and transition the image into a second input mode for generating the second input information without generating the first input information.

12 Claims, 10 Drawing Sheets

FIG 5A
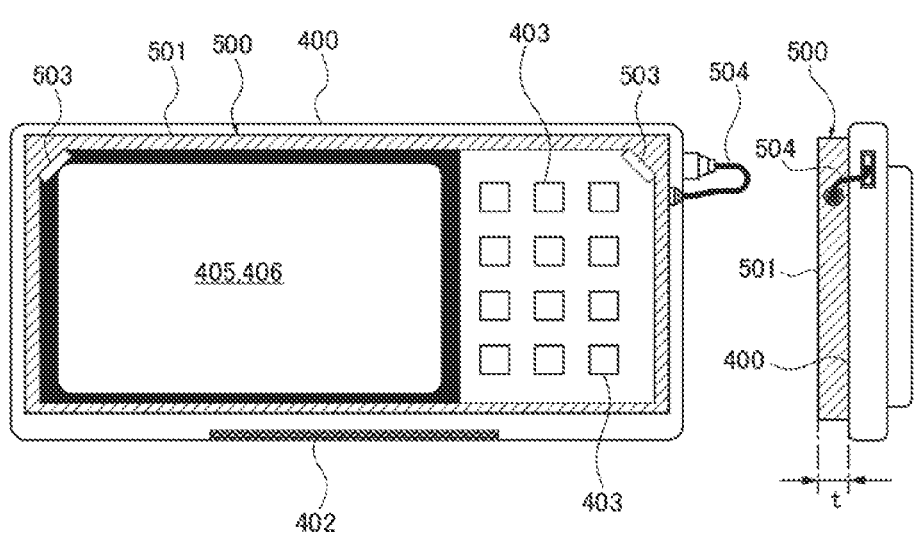
FIG 5B
FIG 5C
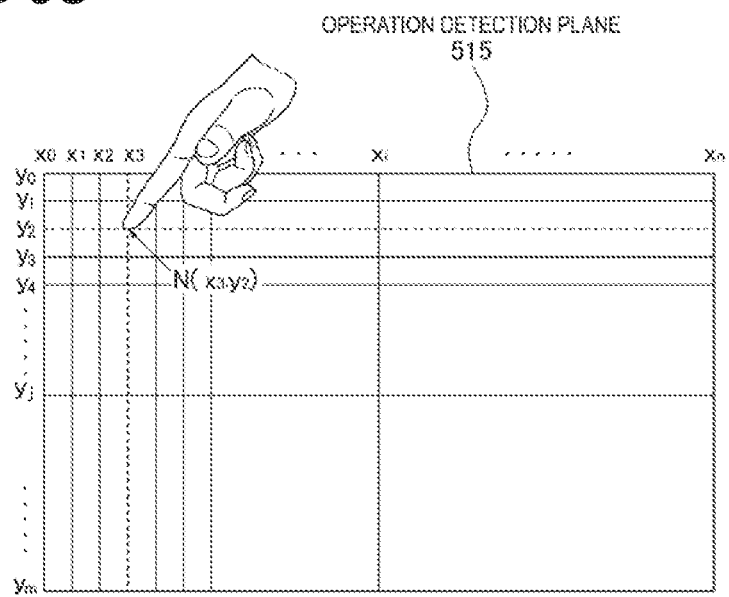

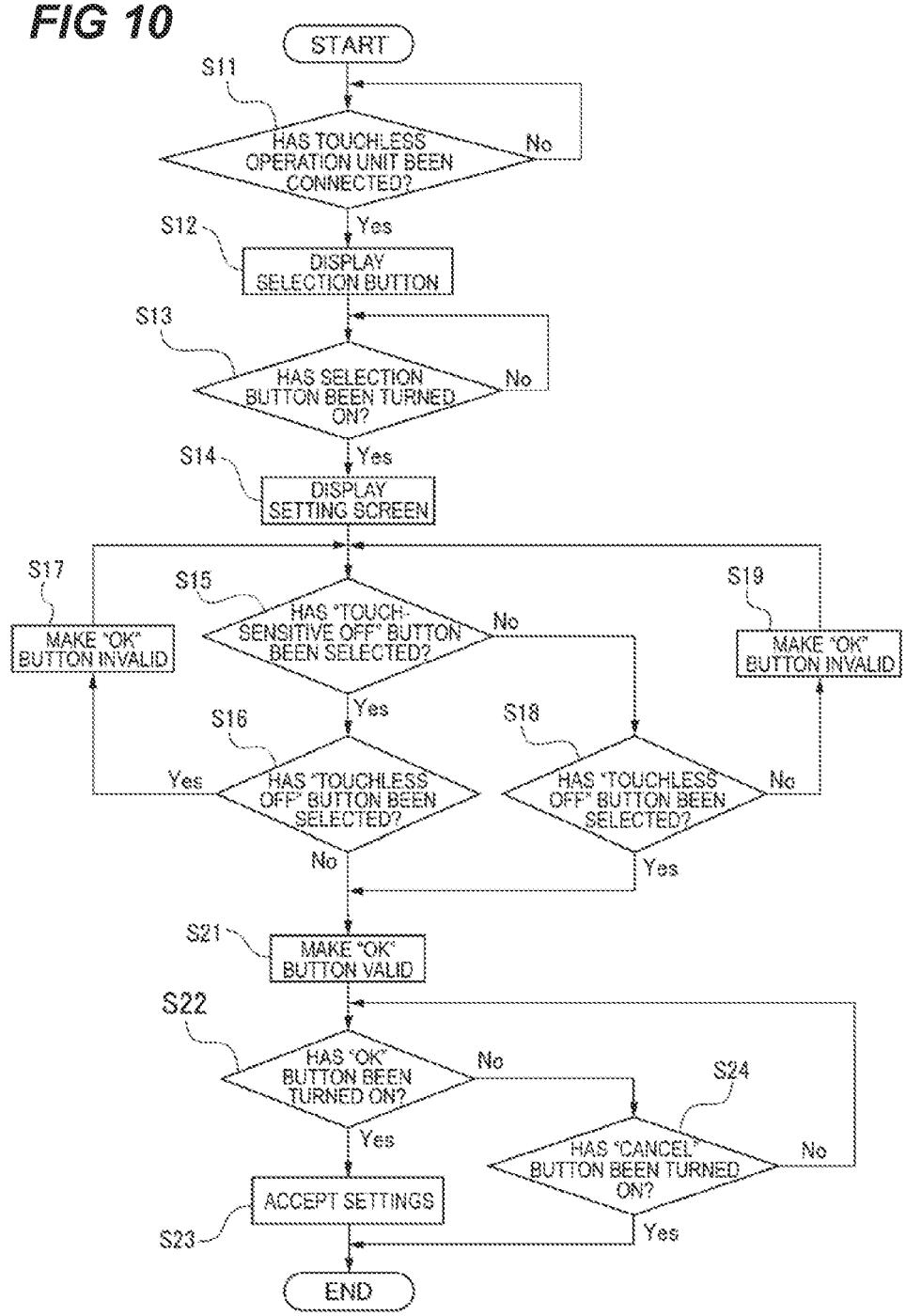

IMAGE FORMING APPARATUS WITH TOUCH AND TOUCHLESS INPUT PORTION

BACKGROUND

Field

The present disclosure relates to an image forming apparatus including a touch input portion and a touchless input portion.

Description of the Related Art

Conventionally, a touch operation, in which a user touches a touch panel or button to operate an apparatus, has been widely adopted in apparatuses, such as ticket machines and ATMs. Regarding such apparatuses, for avoidance of a touch operation that can be the source of infection of a pathogen, in recent years, the demand for an operation to an apparatus without contact with a touch panel or button has increased. US2020/0319750 discloses an input device that receives a touchless operation.

For office machines, such as multi-function peripherals, each including a touch panel that receives a touch operation, an input method with a touchless operation has been examined.

However, a touchless operation in which an input is made at a location a predetermined distance away from a display screen is not necessarily adequate for a reliable operational feeling in comparison to a touch operation where an input is made via contact with an operation face.

Thus, in a case where an operator needs a reliable operational feeling, a touch operation is likely to be required instead of a touchless operation.

In consideration of the above, it is desirable to provide an image forming apparatus including a touch input portion and a touchless input portion and enabling an operator's intended operation.

SUMMARY

According to an aspect of the present disclosure an image forming apparatus includes an image forming portion configured to form an image on a recording medium, a display portion configured to display information regarding image forming with the image forming portion, a memory storing instructions, and a controller, which executes the instructions, configured to detect a position of an instruction portion in contact with a surface of the display portion and generate first input information indicating the detected position of the instruction portion, and detect a position of the instruction portion at a location a predetermined distance away from the surface in a direction orthogonal to the surface and generate second input information indicating the detected position, and transition the image forming apparatus into a first input mode for generating the first input information without generating the second input information and transition the image into a second input mode for generating the second input information without generating the first input information.

Further features will become apparent from the following description of exemplary embodiments with reference to the attached drawings.

BRIEF DESCRIPTION OF THE DRAWINGS

FIGS. 5A and 5B illustrate views of the touchless operation unit attached to the operation portion.

FIG. 5C illustrates "xy" coordinate axes superimposed on the operation detection plane of the touchless operation unit.

FIG. 10 is a flowchart of the operation of a controller in the exemplary embodiment.

DESCRIPTION OF THE EMBODIMENTS

The configuration of an image forming apparatus according to an exemplary embodiment will be described below with reference to the accompanying drawings. Unless otherwise specified, the dimensions, material, and shape of each of the following constituent components and the relative arrangement thereof should not be construed to limit the scope of the disclosure. In the following description, an electrophotographic system is exemplified as a system of forming an image on a recording medium, but this is not limiting. Other systems, such as an inkjet system, can be used.

Figure 1:
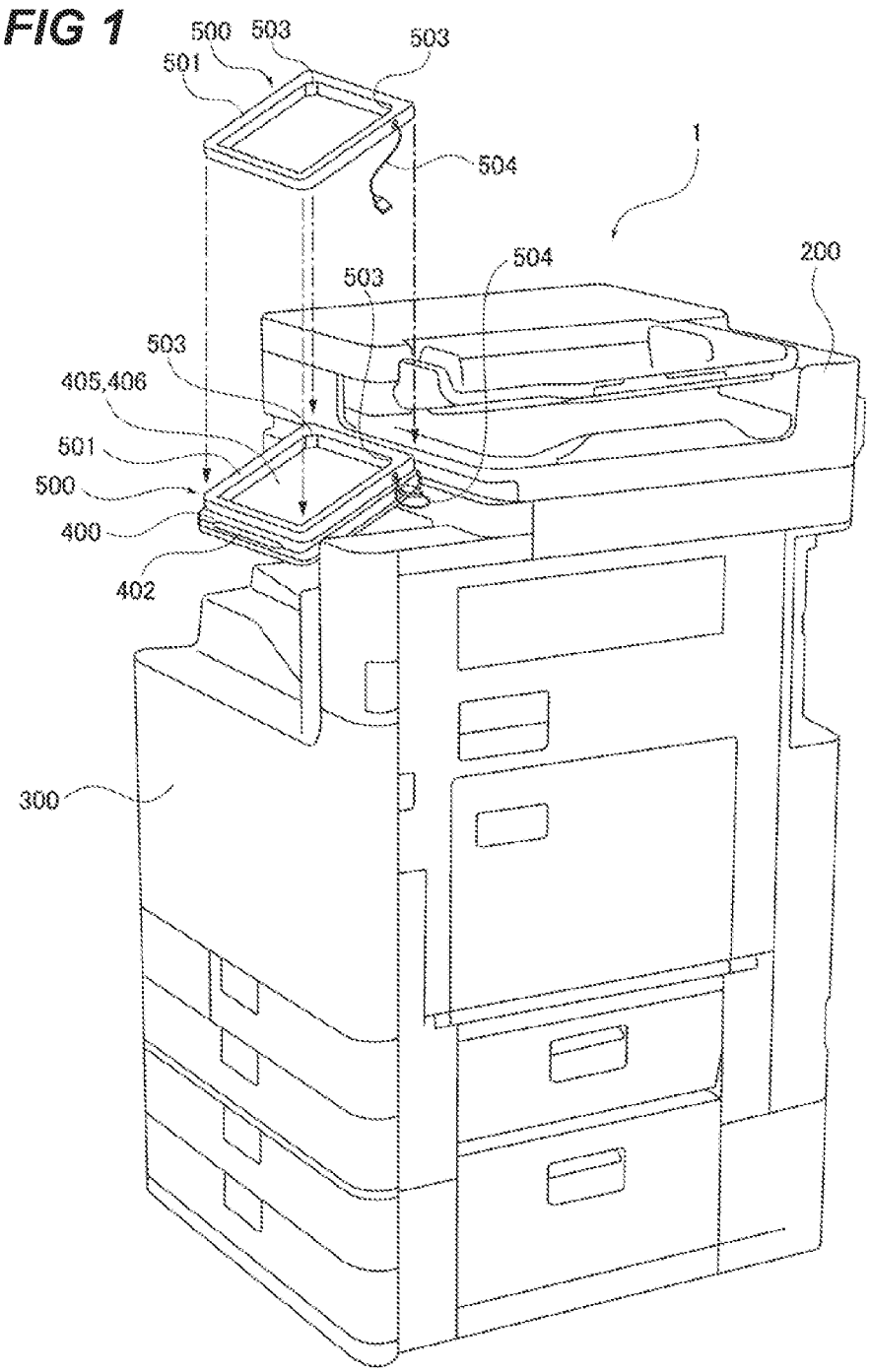
FIG. 1 illustrates an image forming apparatus in an exemplary embodiment.

FIG. 1 illustrates an image forming apparatus 1 of the present embodiment. As illustrated in FIG. 1, the image forming apparatus 1 includes a printer portion 300 as an image forming portion that forms an image on a recording medium, and a scanner portion 200 as an image reading portion that optically reads an image of an original placed on a glass face (not illustrated) and converts the image into image data. The image forming apparatus 1 also includes an operation portion 400 and a touchless operation unit 500.

The operation portion 400 includes a liquid crystal display (LCD) 406 as a display portion that displays a screen for setting conditions for image forming by the printer portion 300 onto a recording medium or the state of the image forming apparatus 1. The LCD 406 displays, as information regarding image forming, settings regarding image forming, such as the number of sheets for image forming and the size of a recording medium, or the state of the image forming apparatus 1.

The operation portion 400 also includes a touch panel 405 for inputting an instruction to the image forming apparatus 1. The touch panel 405 is superimposed on the LCD 406 in the direction orthogonal to the display face of the LCD 406. Specifically, with respect to a user viewing the screen, the touch panel 405 is located closer to the user than the LCD 406 is. The LCD 406 and the touch panel 405 correspond to a display portion. Since the touch panel 405 is located closer to the user than the LCD 406 is, the face that the user touches on the touch panel 405 corresponds to the surface of the display portion.

In the present embodiment, switching can be performed between a touch mode for input with the touch panel 405 and a touchless mode for input with the touchless operation unit 500. As described in detail below, switching between the two modes can be performed based on an operation to a hardware key 403, an operation to the touch panel 405, an operation to the touchless operation unit 500, or connection of an external operation device to the image forming apparatus 1. Input information acquired in response to an operation to the hardware key 403, the touch panel 405, or the touchless operation unit 500 is transmitted to an operation-portion CPU 401. Switching between the input modes can be performed by the operation-portion CPU 401 or a controller 100. That is, the operation-portion CPU 401 and the controller 100 each correspond to a switching portion.

In the touch mode, when the user touches the touch panel 405 with, for example, a finger or a stylus (hereinafter referred to as "instruction portion"), a touch-panel control portion 404 detects the touched position on the touch panel 405 and generates coordinate data indicating the detected touched position. The touch panel 405 and the touch-panel control portion 404 correspond to a first generation portion that detects the touched position on the touch panel 405 and generates first input information (coordinate data) indicating the detected touched position. The user can thus carry out, by touching the screen displayed on the display face of the LCD 406, setting regarding image forming, such as setting of the number of sheets for image forming or setting of the size of a recording medium, or setting regarding image reading, such as setting of the size of an original.

The operation portion 400 includes hardware keys 403 located out of the region in which the LCD 406 is located, in addition to the LCD 406 on which the touch panel 405 is superimposed. The hardware keys 403 include keys and numeric keys for instructing the image forming apparatus 1 to operate based on settings regarding image forming or a job order.

The operation portion 400 also includes a light emitting diode (LED) 402 that turns on, turns off, or turns on and off to notify a user not located in immediate proximity to the image forming apparatus 1 of the state of the image forming apparatus 1, such as the occurrence of an error or image forming processing currently being performed.

In the touchless mode, a touchless sensor 503 detects, at a location a predetermined distance away from the display face of the LCD 406 in the direction orthogonal to the display face of the LCD 406, the position of the instruction portion having come to the location, and a touchless-sensor control portion 502 generates coordinate data indicating the detected position. That is, the touchless sensor 503 and a touchless-sensor control portion 502 correspond to a second generation portion that detects the position of the instruction portion having come to the location a predetermined distance away from the display face of the LCD 406 and generates second input information (coordinate data) indicating the detected position.

In the touch mode, the first input information is generated, but no second input information is generated. In the touchless mode, the second input information is generated, but no first input information is generated. That is, the touch mode corresponds to a first input mode and the touchless mode corresponds to a second input mode.

According to the above configuration, in the touchless mode, without touching the LCD 406 (touch panel 405), the user can carry out setting regarding image forming, such as setting of the number of sheets for image forming or setting of the size of a recording medium, or setting regarding image reading, such as setting of the size of an original document.

The touchless operation unit 500 includes a casing (frame body) that can be superimposed on the operation portion 400 to surround the outer circumference of the operation portion 400. The touchless operation unit 500 is attachable to the operation portion 400 as illustrated in FIG. 1. In the present example, the touchless operation unit 500 is retrofitted as an optional device to the image forming apparatus 1, but this implementation is not seen to be limiting. The touchless operation unit 500 can be integrated with the image forming apparatus in advance.

As described above, FIG. 1 illustrates the image forming apparatus 1 according to the present embodiment, to which the touchless operation unit 500 is attached. As described above, the touchless operation unit 500 includes a frame body 501 that serves as a casing. The frame body 501 includes an opening (corresponding to the region of the touch panel 405) at its center and surrounds the four outer sides of the LCD 406 so that the display face of the LCD 406 can be viewed. However, the structure of the frame body 501 is not limited to this configuration. In another exemplary embodiment, for example, the frame body 501 can be structurally placed on a single outer side or two outer sides of the LCD 406 as long as the detection range of the touchless sensor 503 (operation detection plane 515 illustrated in FIGS. 5C to 6C), described below, covers the entire region of the touch panel 405. As previously described, the frame body 501 serves as a casing that surrounds the four outer sides of the LCD 406.

The touchless operation unit 500 includes the touchless sensor 503. The touchless sensor 503 can detect the instruction portion having entered inside the frame body 501 and the position of the instruction portion inside the casing frame, which is described in more detail below.

The touchless operation unit 500 also includes a connection cable 504 as a connection portion for electrical connection to the image forming apparatus 1. The image forming apparatus 1 can have the connection cable 504 connected thereto. In response to connection of the connection cable 504 to the operation portion 400, the touchless operation unit 500 is electrically connected to the image forming apparatus 1. The touchless operation unit 500 transmits, to the operation portion 400 through the connection cable 504, input information indicating the detected position of the instruction portion.

Figure 2:
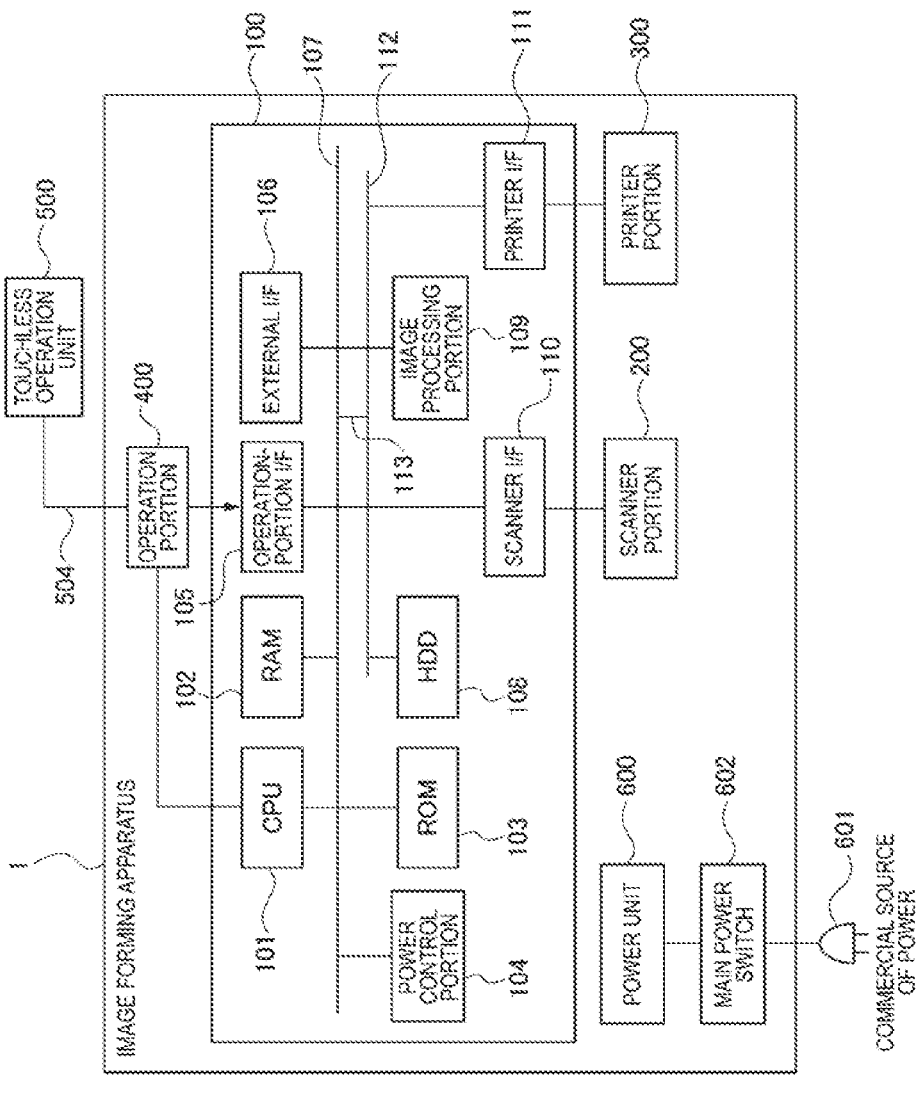
FIG. 2 is a block diagram of the system configuration of the image forming apparatus in the exemplary embodiment.

As illustrated in FIG. 2, the image forming apparatus 1 includes the controller 100, the scanner portion 200 as an image reading portion, the printer portion 300 as an image forming portion, the operation portion 400, the touchless operation unit 500, and a power unit 600.

The controller 100 is communicably connected to the scanner portion 200, the printer portion 300, and the operation portion 400.

The scanner portion 200 reads an image of an original document via an image pickup element, such as a CCD (not illustrated), converts the image into digital image data (e.g., RGB), and transfers the digital image data to the controller 100.

The printer portion 300 includes an electrophotographic image forming portion (not illustrated) that forms an image on a recording medium. In response to the digital image data transferred from the controller 100, the printer portion 300 exposes a photoconductor to form a latent image, develops the latent image with toner, transfers and fixes the developed toner image to a recording medium, and outputs the recoding medium.

The power unit 600 receives power from a commercial source of power via a power plug 601, performs conversion to power for use in each component, and supplies the power to each component. When a main power switch 602 is switched from off to on, the power unit 600 supplies power to the controller 100. Then, based on an instruction from the controller 100, the power unit 600 supplies power to the scanner portion 200, the printer portion 300, the operation portion 400, and the touchless operation unit 500.

The controller 100 includes CPU 101, a RAM 102, a ROM 103, a power control portion 104, an operation-portion interface (I/F) 105, and an external I/F 106 that are connected to each other via a system bus 107. The controller 100 also includes a HDD 108, an image processing portion 109, a scanner I/F 110, and a printer I/F 111 that are connected to each other via an image data bus 112. The system bus 107 and the image data bus 112 are connected via a bus bridge 113, so that each component connected to the system bus 107 and each component connected to the image data bus 112 can communicate.

The CPU 101, based on various types of programs stored in the ROM 103 and the HDD 108, performs initialization of each component, communication with each component, and various types of control.

The RAM 102 is used for storing a program for causing the CPU 101 to operate or as a work area for information processing or image processing.

The ROM 103 stores a boot program for causing the CPU 101 to boot and backup data of control parameters for image control. At the time of power startup of the image forming apparatus 1, the CPU 101 reads out the boot program from the ROM 103, stores the boot program in the RAM 102, and initializes each component according to the boot program.

The power control portion 104 performs ON/OFF control of power supply from the power unit 600 to each component.

The operation-portion I/F 105 is a first interface between the system bus 107 and the operation portion 400 and delivers a command or status regarding input information or display information. The controller 100 transmits display image data stored in the HDD 108 to the operation portion 400, resulting in display on the LCD 406.

In the present embodiment, the touchless operation unit 500 is connected to the operation portion 400 via the connection cable 504, resulting in electrical connection to the image forming apparatus 1. Thus, the controller 100 delivers, between the system bus 107 and the operation portion 400 via the operation-portion I/F 105, input information from the touch panel 405 as well as information from the touchless operation unit 500.

The external I/F 106 delivers data or the like between the system bus 107 and a device connected via a connection portion, such as a USB connection portion (not illustrated). The controller 100 delivers, via the external I/F 106, data or the like between the system bus 107 and the device connected via the connection portion. The CPU 101 determines, using the external I/F 106, whether a device is connected to the image forming apparatus 1.

The HDD 108 stores an OS or a control program that is executed by the CPU 101, an application program, and image data. The HDD 108 is also used as a temporary work area at the time of image processing.

With the RAM 102 or the HDD 108 as a work area, the image processing portion 109 performs various types of image processing, such as enlargement, reduction, rotation, resolution conversion, compression such as JPEG, decompression, color conversion, and color adjustment.

The scanner I/F 110 delivers scanned digital image data between the scanner portion 200 and the image data bus 112 or communicates with the scanner portion 200.

The printer I/F 111 delivers image data for printing between the printer portion 300 and the image data bus 112 or communicates with the printer portion 300.

The system bus 107 and the image data bus 112 each serve as a transmission line for delivery of information necessary for communication with the operation portion 400, such as a command or status, in addition to image data. The system bus 107 and the image data bus 112 are connected via the bus bridge 113, which enables data delivery.

Figure 3:
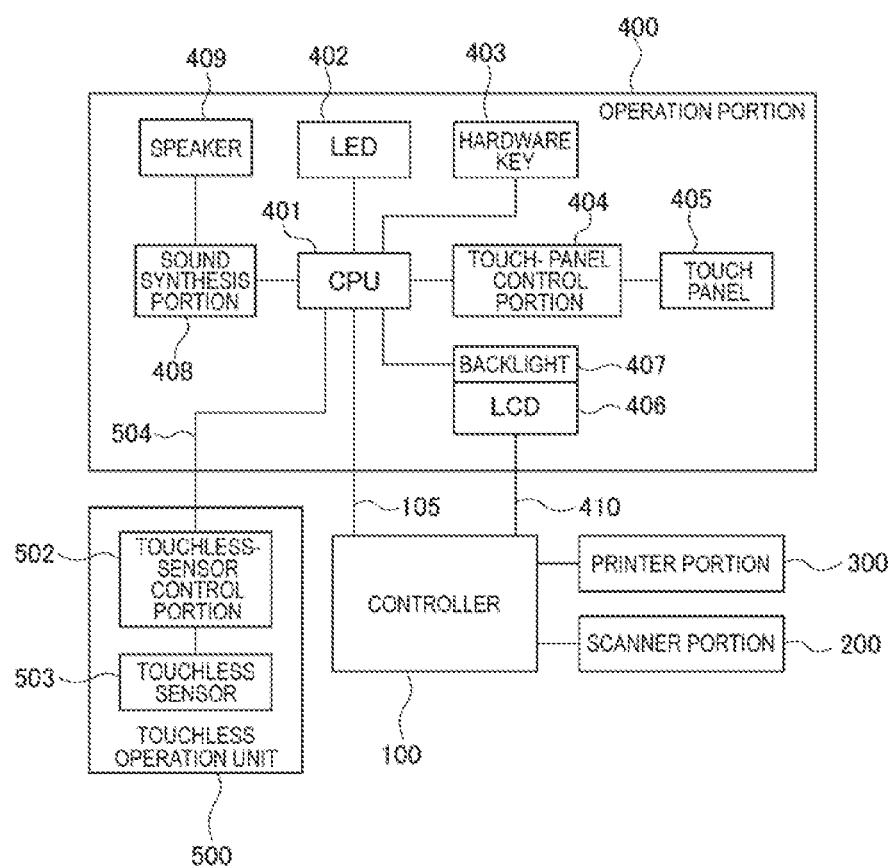
FIG. 3 is a block diagram of the system configuration of an operation portion and a touchless operation unit.

FIG. 3 is a block diagram of the system configuration of the operation portion 400 and the touchless operation unit 500 according to the present embodiment.

The controller 100, in communication with the operation portion 400, receives, as an input, settings regarding conditions for reading or image forming or an execution for image forming and performs display control or sound emission control corresponding to the apparatus state. For specific description of such operations, the operation portion 400 and the touchless operation unit 500 will be described below.

The operation portion 400 includes the operation-portion CPU 401, the LED 402, the hardware keys 403, the touch-panel control portion 404, the touch panel 405, the LCD 406, a backlight 407, a sound synthesis portion 408, and a speaker 409.

The operation-portion CPU 401 operates based on a program stored in a built-in ROM (not illustrated), to communicate with the controller 100.

Specifically, the operation-portion CPU 401 detects whether a hardware key 403 has been selected, and notifies the controller 100 of a detection result. The touch-panel control portion 404 detects whether the touch panel 405 has been touched by the instruction portion, calculates coordinate data indicating the touched position, and transmits a result thereof to the operation-portion CPU 401. The coordinate data indicating the touched position of the touch panel 405 is defined as first input information.

The controller 100 receives various types of inputs from the operation portion 400 and generates, as necessary, respective commands for lighting, blinking, or non-lighting control of the LED 402, brightness adjustment control of the backlight 407 for the LCD 406, and sound emission control for sound emission with the speaker 409. The controller 100 then transmits the commands to the operation-portion CPU 401 via the operation-portion I/F 105. The operation-portion CPU 401 receives and decodes the commands and performs, according to a result thereof, lighting, blinking, or non-lighting control of the LED 402, brightness adjustment control of the backlight 407, and sound emission control of the speaker 409 with a command generated by the sound synthesis portion 408. Based on the various types of inputs from the operation portion 400, the controller 100, as necessary, reads out display screen data from the HDD 108 and causes, via a screen display I/F 410, the LCD 406 to display a screen.

The touchless operation unit 500 includes the touchless sensor 503 and the touchless-sensor control portion 502. As described with FIG. 1, the touchless operation unit 500 includes the casing (frame body 501) surrounding the touch panel 405, the LCD 406, and the hardware keys 403 and is located on the operation portion 400. The touchless sensor 503 detects the presence or absence of the instruction portion in the space surrounded by the casing (region of the screen displayed on the LCD 406). The space surrounded by the casing is a region 413 corresponding to the opening of the frame body 501 illustrated in FIG. 5A (refer to FIG. 7). Based on a detection result from the touchless sensor 503, the touchless-sensor control portion 502 calculates coordinate data indicating the position of the instruction portion in a plane parallel to the touch panel 405 (operation detection plane 515 described below) in the space surrounded by the casing. In this case, the coordinate data indicating the position of the instruction portion detected by the touchless operation unit 500 is defined as second input information. The coordinate data is then transmitted to the operation-portion CPU 401 via the connection cable 504. That is, the touchless operation unit 500 as the second generation portion detects, at a location a predetermined distance away from the LCD 406, the position of the instruction portion having come to the location, generates the second input information (coordinate data) indicating the detected position, and transmits the second input information to the CPU 401.

The operation-portion CPU 401 receives both the coordinate data generated at the time of a touch operation on the touch panel 405 and the coordinate data generated in response to detection of the instruction portion by the touchless sensor 503. With the first input mode set, the controller 100 performs processing based on the coordinate data acquired by the touch panel 405, without processing based on the coordinate data acquired by the touchless operation unit 500. With the second input mode set, the controller 100 performs processing based on the coordinate data acquired by the touchless operation unit 500, without processing based on the coordinate data acquired by the touch panel 405.

In the first input mode, the operation-portion CPU 401 can receive the coordinate data acquired by the touch panel 405 without receiving the coordinate data acquired by the touchless operation unit 500. In the second input mode, the operation-portion CPU 401 can receive the coordinate data acquired by the touchless operation unit 500 without receiving the coordinate data acquired by the touch panel 405.

The operation-portion CPU 401 provides data to be transmitted as an identifier indicating whether the touch-panel control portion 404 or the touchless-sensor control portion 502 the received coordinate data is based on. Based on the identifier, the controller 100 can identify whether the touch-panel control portion 404 or the touchless-sensor control portion 502 the received coordinate data is based on.

Figure 4A:
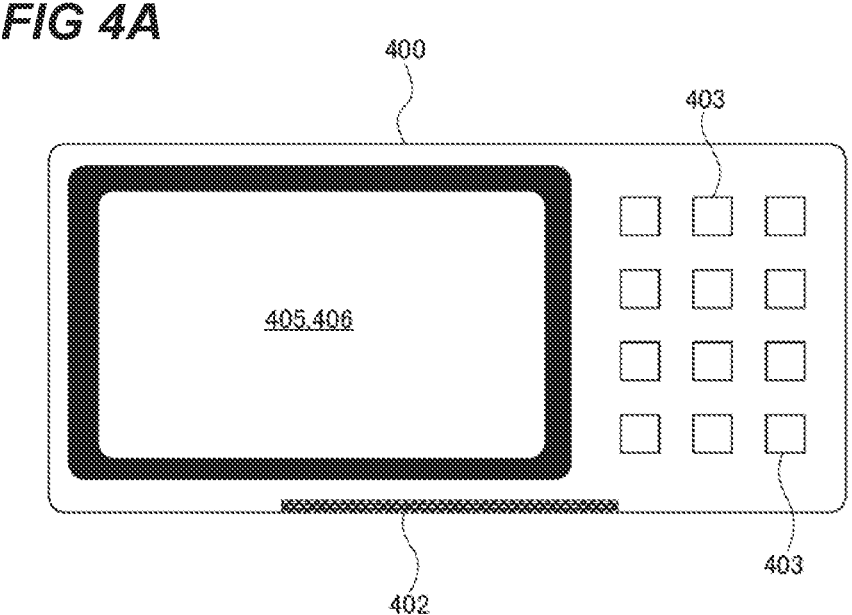
FIG. 4A is a front schematic view of the operation portion.

FIG. 4A is a front schematic view of the operation portion 400. The touch panel 405 consists of transparent glass or a transparent film and is superimposed on the LCD 406 so that the display screen of the LCD 406 can be viewed through the touch panel 405. The operation portion 400 has the hardware keys 403 located in a first region where the touch panel 405 (LCD 406) is located. The LED 402 is located so it is easily viewed from in front of the image processing apparatus 1. The operation portion 400 notifies an operator of the image forming apparatus 1 of an operation screen to enter various inputs, a state of the image forming apparatus 1, etc, via the display face of the LCD 406 or by lighting, non-lighting, or blinking of the LED 402. Various types of inputs or a setting operation is received from the operator through the touch panel 405 or a hardware key 403.

Figure 4B:
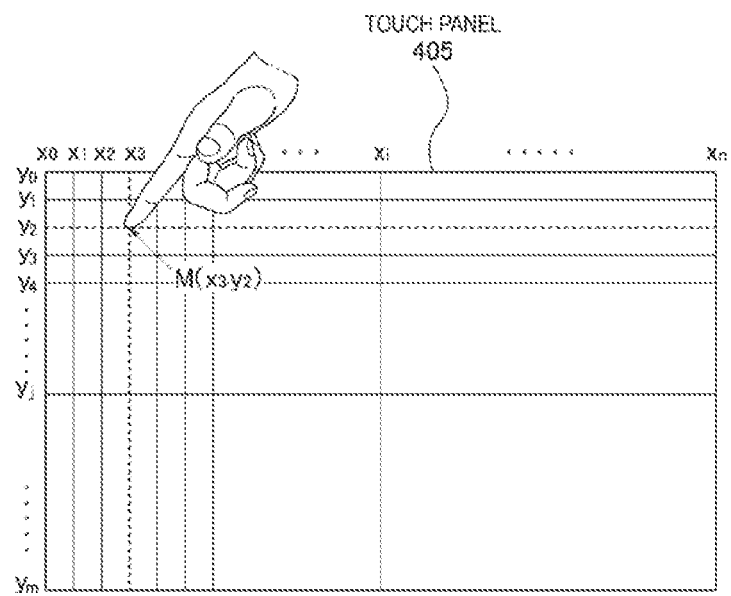
FIG. 4B illustrates "xy" coordinate axes superimposed on a touch panel.

FIG. 4B illustrates "xy" coordinate axes superimposed on the touch panel 405. The touch-panel control portion 404 virtually divides the touch panel 405 into equal "n" parts in the horizontal axis (x-axis) direction and into equal "m" parts in the vertical axis (y-axis) direction, in which the coordinates of partitions in the x-axis are defined as "x0 to xn" and the coordinates of partitions in the direction of the y-axis are defined as "y0 to ym". The touched position can then be detected as a coordinate point on the "xy" plane.

Referring to FIG. 4B, the touched position M corresponds to the coordinate point (x3, y2). For example, in a case where M (x3, y2) is included in the region of the touch panel 405 overlapping any key on a screen displayed by the LCD 406, in response to detection of the touch on the point of M, it is determined that the key has been selected. As described above with respect to FIG. 2, in this manner, the touch-panel control portion 404 notifies the operation-portion CPU 401 of the coordinate data M (x3, y2) indicating the position touched by the user.

Figure 7:
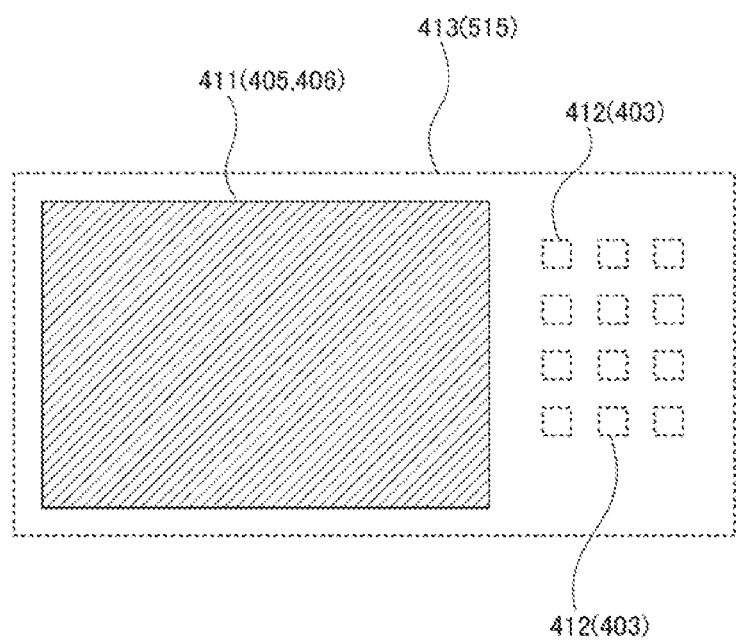
FIG. 7 is a view of a region corresponding to the opening of a frame body of the touchless operation unit, a first region, and second regions.

FIG. 5A is a schematic view of the touchless operation unit 500 attached to the operation portion 400 in the direction orthogonal to the display face of the LCD 406. FIG. 7 is a view of the region 413 corresponding to the opening of the frame body 501 of the touchless operation unit 500, a first region 411, and second regions 412. The frame body 501 of the touchless operation unit 500 serves as a casing that has an opening (first region 411 and second regions 412) at its center and surrounds the four outer sides of the first region 411 indicating the position of the LCD 406 of the operation portion 400 and the second regions 412 in which the hardware keys 403 of the operation portion 400 are respectively located. In the present embodiment, the touchless sensor 503 is attached to either end of the upper side of the touchless operation unit 500. The touchless sensor 503 is, for example, an infrared sensor and emits or receives infrared light at predetermined timings. Entry of the instruction portion into the frame of the touchless operation unit 500 causes a change in the characteristic of receipt of infrared light. Based on the change, the touchless-sensor control portion 502 detects the presence or absence of the instruction portion. That is, the touchless-sensor control portion 502 detects that the instruction portion is in a location a predetermined distance away from the display face of the LCD 406 or a hardware key 403 and detects the position of the instruction portion. The touchless sensors 503 attached to the two places calculates that the instruction portion is in a location a predetermined distance away from the display face of the LCD 406 or the hardware key 403 and coordinate data indicating the position of the instruction portion. Specifically, the touchless sensors 503 are provided on a plane parallel to the touch panel 405 and the LCD 406 in the space (region 413) surrounded by the frame body 501 of the touchless operation unit 500. Then, in response to detection of entry of the instruction portion into the plane (operation detection plane 515 described below), the distance between the instruction portion and each touchless sensor on the plane is detected, and the position of the instruction portion on the plane is then calculated by triangulation. The calculated coordinate data indicating the position of the instruction portion is transmitted to the operation portion 400 via the connection cable 504.

FIG. 5B is a schematic view of the touchless operation unit 500 attached to the operation portion 400.

The touchless operation unit 500 is attached to achieve an intuitive operation to the display screen of the LCD 406 or a hardware key 403 without touching the touch panel 405 or the hardware key 403. The frame body 501 of the touchless operation unit 500 needs to have a thickness "t" such that the coordinate position of the instruction portion that operates without touching the touch panel 405 and any hardware key 403 can be detected on the plane parallel to the touch panel 405 (operation detection plane 515 described below). If the touchless operation unit 500 is excessively thick, the instruction portion is hindered from providing an operation, resulting in low operability. If the plane for detection of the coordinate position is excessively far away from the display face of the LCD 406, intuition is lost, resulting in low operability. Therefore, an appropriate distance from the touch panel 405 is required. In the present embodiment, the thickness "t" of the frame body 501 is approximately 50 mm and the plane for coordinate detection is approximately 30 mm away from the touch panel 405. These distances are not seen to be limiting and any distances that would enable practice of the present disclosure is applicable. That is, the instruction portion is detected at a location a predetermined distance (e.g., 30 mm) away from the display face of the LCD 406 in the direction orthogonal to the display face of the LCD 406. In other words, the instruction portion in a location a predetermined distance (e.g., 30 mm) away from the display face of the LCD 406 in the direction orthogonal to the display face of the LCD 406 is detected.

In the present embodiment, the connection cable 504 and a socket for the connection cable 504 of the operation portion 400 are closer at the time of attachment because the cable length can be shortened and the excessive length is not annoying to the user. However, any distance that would enable practice of the present disclosure is applicable.

FIG. 5C illustrates "xy" coordinate axes superimposed on the operation detection plane 515.

The touchless-sensor control portion 502 virtually divides the operation detection plane 515 into equal "n" parts in the horizontal axis (x-axis) direction and into equal "m" parts in the vertical axis (y-axis) direction, in which the coordinates of partitions in the x-axis direction are defined as "x0 to xn" and the coordinates of partitions in the y-axis direction are defined as "y0 to ym". The position of the instruction portion having entered the operation detection plane 515 can be detected as a coordinate point on the "xy" plane.

Referring to FIG. 5B, the touched position N corresponds to the coordinate point (x3, y2). For example, in a case where N (x3, y2) is included in the region of the operation detection plane 515 overlapping any key on a screen displayed by the LCD 406, in response to detection of the touchless operation on the point of N, it is determined that the key has been selected. As described above with respect to FIG. 2, in this manner, the touchless-sensor control portion 502 notifies the operation-portion CPU 401 of the coordinate data N (x3, y2) indicating the position of the touchless operation by the user.

Figure 6A:
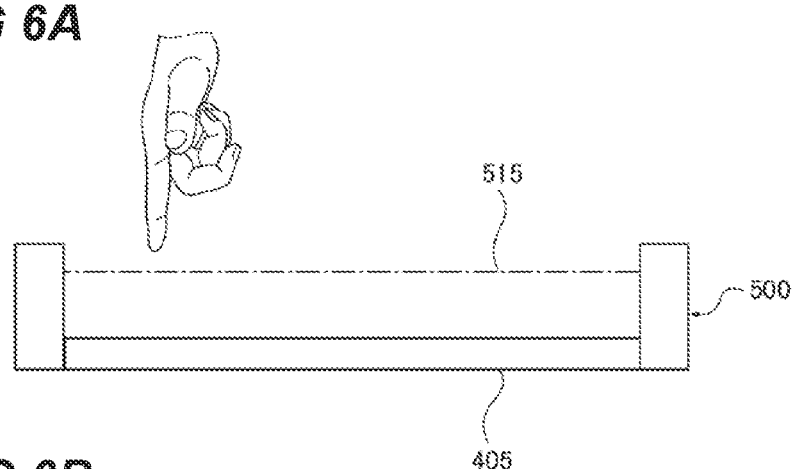
FIGS. 6A, 6B, and 6C illustrate sectional views of the touch panel and the touchless operation unit.
Figure 6B:
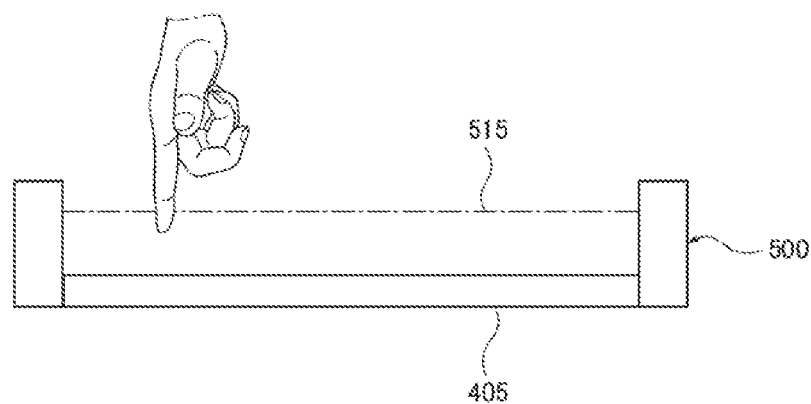
Figure 6C:
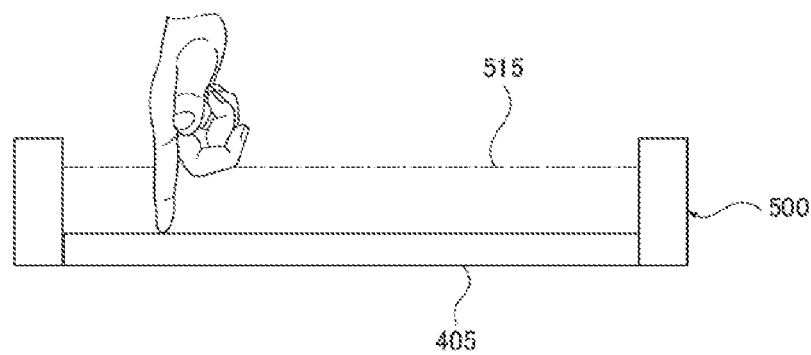

FIGS. 6A, 6B, and 6C are each a sectional view of the touch panel 405 and the touchless operation unit 500.

FIGS. 6A, 6B, and 6C each illustrate the touch panel 405 in the operation portion 400 without any hardware key 403. However, the distance between the operation detection plane 515 and each hardware key 403 approximately the same as the distance between the operation detection plane 515 and the touch panel 405. Therefore, a touchless operation to any hardware key 403 is similar to a touchless operation to the touch panel 405 in the following description.

As described above with respect to FIGS. 5A to 5C, in response to entry of an instruction portion into the operation detection plane 515 as a plane parallel to the touch panel 405 in the space inside the frame of the touchless operation unit 500, the touchless operation unit 500 determines that an operation has been provided to the operation portion 400. Because the instruction portion has not entered the operation detection plane 515 in the state of FIG. 6A, it is determined that no operation has been provided. Because the instruction portion has entered the operation detection plane 515 in the state of FIG. 6B, it is determined that an operation has been provided.

FIG. 6C illustrates the instruction portion having touched the touch panel 405 via the operation detection plane 515. In this case, coordinate data due to the touchless operation and coordinate data of the touched position of the touch panel 405 are both generated. However, even in this case, as described above with respect to FIG. 2, since each piece of coordinate data generated has a unique identifier given thereto, the controller 100 can determine what each piece of coordinate data generated is.

The coordinate data detectable with the operation detection plane 515 of the touchless operation unit 500 is defined as a range including all the coordinate data detectable by the touch panel 405 and the coordinate data corresponding to each hardware key 403. The first region 411 illustrated in FIG. 7 corresponds to the range of detection of the instruction portion by the touch panel 405. Each second region 412 illustrated in FIG. 7 is out of the first region 411 and corresponds to a hardware key 403. The region 413 illustrated in FIG. 7 corresponds to a range including all the range of detection of the touch panel 405 (first region 411) and the region to which each hardware key 403 corresponds (second region 412). The region 413 illustrated in FIG. 7 corresponding to the opening of the frame body 501 of the touchless operation unit 500 corresponds to the range of detection of the instruction portion by the touchless sensors included in the touchless operation unit 500. In the present embodiment, the case where the operation portion 400 includes the hardware keys 403 has been discussed, but this is not limiting. The operation portion 400 does not necessarily include any hardware key 403.

Figure 8:
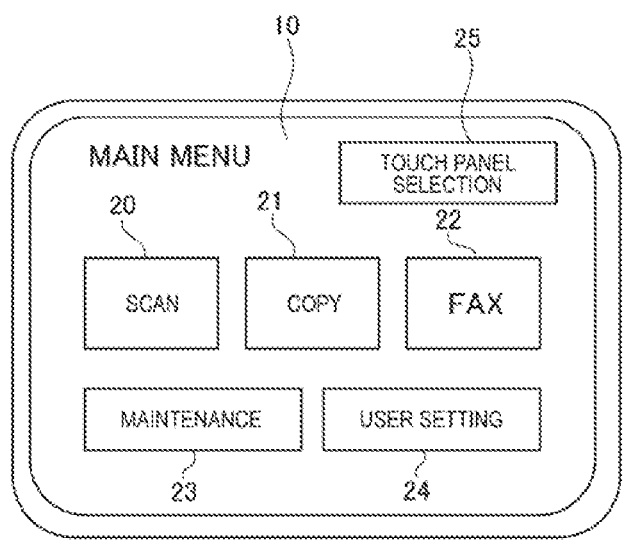
FIG. 8 illustrates a main screen of the operation portion in the exemplary embodiment.
Figure 9A:
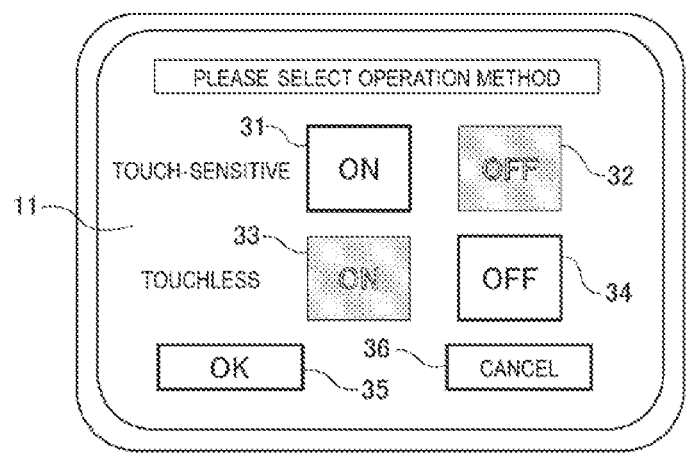
FIGS. 9A and 9B illustrate exemplary setting screens for setting the touch panel and the touchless operation unit as valid or invalid.
Figure 9B:
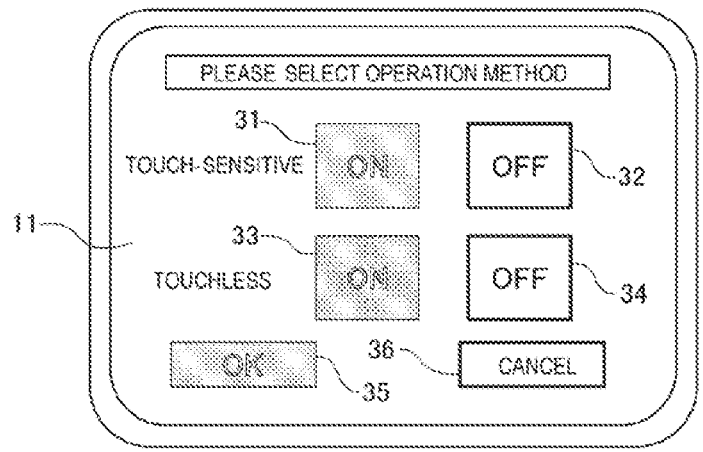

The operation of the controller 100, including displaying, on the LCD 406, a setting screen for setting the touch panel 405 and the touchless operation unit 500 as valid or invalid, will be described with screens illustrated in FIGS. 8 to 9B and a flowchart illustrated in FIG. 10. FIG. 8 illustrates a main screen that the LCD 406 displays on its display face. FIGS. 9A and 9B each illustrate a setting screen that the LCD 406 displays on its display face. FIG. 10 is a flowchart of the operation of the controller 100 at the time of setting of the touch panel 405 and the touchless operation unit 500 as valid or invalid.

In the present embodiment, the touchless operation unit 500 is electrically connected to the image forming apparatus 1, e.g., to the cable socket of the operation portion 400, via the connection cable 504. If the controller 100 receives a signal indicating that the connection cable 504 of the touchless operation unit 500 has been connected (S11 of FIG. 10), the controller 100 reads out display screen data from the HDD 108 as a storage portion, transmits the display screen data to the operation portion 400 via the operation-portion I/F 105, resulting in display of the display image data on the LCD 406. That is, the controller 100 causes the LCD 406 to display the main screen 10 illustrated in FIG. 8 (S12 of FIG. 10).

The main screen 10 illustrated in FIG. 8 includes icons, such as a "scan" button 20, a "copy" button 21, and a "FAX" button 22, as functions of the image forming apparatus 1. The main screen 10 also includes "maintenance" button 23 for displaying the menu for maintenance in the image forming apparatus 1 and a "user setting" button 24 for settings in the state of maintenance and settings for various types of components. The illustrated buttons are examples, and are not limitative in terms of number, type, name, etc. A "touch panel selection" button 25 is displayed on the main screen 10 in a case where the touchless operation unit 500 is in connection with the image forming apparatus 1. Otherwise, the "touch panel selection" button 25 is not displayed.

Attachment of the touchless operation unit 500 to the image forming apparatus 1 enables the controller 100 to acquire input information from the touch panel 405 and input information from the touchless operation unit 500. In the default state before acceptance of settings, described below, the image forming apparatus 1 according to the present embodiment performs control in response to input information from the touch panel 405 without responding to input information from the touchless operation unit 500.

On the main screen 10 illustrated in FIG. 8, the user turns the "touch panel selection" button 25 ON (S13 of FIG. 10). The controller 100 then reads out display screen data from the HDD 108 and transmits the display screen data to the operation portion 400 via the operation-portion I/F 105, resulting in displaying the display image data on the LCD 406. That is, the controller 100 displays the setting screen 11 illustrated in FIG. 9A on the LCD 406 (S14 of FIG. 10).

The setting screen 11 illustrated in FIG. 9A includes a "touch-sensitive ON" button 31 for making the touch panel 405 that is touch-sensitive valid and a "touch-sensitive OFF" button 32 for making the touch panel 405 invalid. The setting screen 11 also includes a "touchless ON" button 33 for making the touchless operation unit 500 valid and a "touchless OFF" button 34 for making the touchless operation unit 500 invalid. An "OK" button 35 is provided for determination of the settings after ON/OFF selection and returning to the main screen 10 in FIG. 8. A "cancel" button 36 is provided for returning to the main screen 10 in FIG. 8 without determination of the settings. In the present embodiment, the unselected ON and OFF buttons are gray shaded. As such, in the example of the setting screen 11 illustrated in FIG. 9A, the touch panel 405 that is touch-sensitive is valid (ON) and the touchless operation unit 500 is invalid (OFF). The setting screen 11 is an example, is not limitative in terms of screen display, and another display style can be provided. In the present embodiment, as an example, the button for making the touch panel 405 valid and the button for making the touchless operation unit 500 valid are provided on the same screen, but this is not limiting. In another exemplary embodiment, each button can be provided on a different screen. In this case, the screen on which the button for making the touch panel 405 valid is displayed corresponds to a first screen, the screen on which the button for making the touchless operation unit 500 valid is displayed corresponds to a second screen, and the screen on which both of the buttons are displayed corresponds to a third screen.

In a case where the touch panel 405 that is touch sensitive and the touchless operation unit 500 are both set as invalid (OFF) on the setting screen 11 (S15 and S16 in FIG. 10), no portion that detects coordinate data is available. Thus, like the setting screen 11 illustrated in FIG. 9B, the controller 100 makes the "OK" button 35 invalid (gray shading) (S17 in FIG. 10) such that transition to the original main screen 10 (FIG. 8) is controlled to be disabled even when the user selects the "OK" button 35.

In the present embodiment, the "touch-sensitive ON" button 31 or the "touchless ON" button 33 can be selected by the user (S15, S18, S19, and S21) or both of the "touch-sensitive ON" button 31 and the "touchless ON" button 33 can be selected by the user.

The controller 100 detects whether the "OK" button 35 has been operated after transition to the setting screen 11 (S22 in FIG. 10). When detecting that the "OK" button 35 has been turned ON, the controller 100 switches, based on the settings on the setting screen 11, the touch panel 405 that is touch-sensitive and the touchless operation unit 500 between valid and invalid (S23 in FIG. 10). That is, the controller 100 accepts the settings, made on the setting screen 11, for making one of the generation portions valid. After that, a transition is made to the main screen 10 illustrated in FIG. 8.

In a case where the "cancel" button 36 is selected instead of the "OK" button 35 on the setting screen 11 (S24 of FIG. 10), the settings for making the touch panel 405 that is touch sensitive and the touchless operation unit 500 valid or invalid are not accepted, and the process illustrated in FIG. 10 ends. Then, the screen to which a transition is to be made can be the main screen 10 illustrated in FIG. 8 or can be a screen prompting the user for setting reconfirmation (not illustrated).

In the present embodiment, in a case where the setting screen 11 is displayed on the LCD 406 in S14, in response to input information from the touch panel 405, the controller 100 performs setting for valid or invalid without responding to input information from the touchless operation unit 500. However, this is not limiting. In another exemplary embodiment, where the setting screen 11 is displayed on the LCD 406 in S14, in response to input information from the touchless operation unit 500, the controller 100 can perform setting for valid or invalid, without responding to input information from the touch panel 405. In another exemplary embodiment, in a case where the setting screen 11 is displayed on the LCD 406 in S14, in response to both input information from the touch panel 405 and input information from the touchless operation unit 500, the controller 100 can perform setting.

As described above, in response to the settings for valid or invalid on the setting screen 11, selective usage of the touch panel 405 for touch-sensitive input or the touchless operation unit 500 for touchless input is enabled. In other words, since the touch panel 405 or the touchless operation unit 500 is set valid, the user can selectively use the touch panel 405 or the touchless operation unit 500.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-202664, filed Dec. 14, 2021, No. 2022-000737, filed Jan. 5, 2022, No. 2022-000738, filed Jan. 5, 2022, No. 2022-177152, filed Nov. 4, 2022, which is hereby incorporated by reference herein in its entirety.

What is claimed is:

1. An image forming apparatus comprising:
an image forming portion configured to form an image on a recording medium;
a display portion configured to display information regarding image forming with the image forming portion;
a memory storing instructions; and
a controller, which executes the instructions, configured to:
detect a position of an instruction portion in contact with a surface of the display portion and generate first input information indicating the detected position of the instruction portion; and
detect a position of the instruction portion at a location a predetermined distance away from the surface in a direction orthogonal to the surface and generate second input information indicating the detected position, and transition the image forming apparatus into a first input mode for generating the first input information without generating the second input information and transition the image forming apparatus into a second input mode for generating the second input information without generating the first input information, wherein the display portion is capable of displaying a setting screen enabling making the first input mode selectively valid or invalid and making the second input mode selectively valid or invalid via the setting screen.

2. The image forming apparatus according to claim 1, wherein the controller causes the first input mode to be valid or invalid based on the generated first input information in a state where the display portion displays the first screen.

3. The image forming apparatus according to claim 1, wherein the controller causes the first input mode to be valid or invalid based on the generated second input information in a state where the display portion displays the first screen.

4. The image forming apparatus according to claim 1, wherein, the controller causes the second input mode to be valid or invalid based on the generated second input information in a state where the display portion displays the second screen.

5. The image forming apparatus according to claim 1, wherein the controller transitions the image forming apparatus into a third input mode for generating the first input information and the second input information.

6. An image forming apparatus comprising:
an image forming portion configured to form an image on a recording medium;
a display portion configured to display information regarding image forming with the image forming portion;
a memory storing instructions; and
a controller, which executes the instructions, configured to:
detect a position of an instruction portion in contact with a surface of the display portion and generate first input information indicating the detected position of the instruction portion; and
detect a position of the instruction portion at a location a predetermined distance away from the surface in a direction orthogonal to the surface and generate second input information indicating the detected position; and wherein the display portion displays a selection screen for selecting valid status or invalid status of the first input information and in a case that the valid status of the first input information is selected, generation of the second input information is made invalid.

7. The image forming apparatus according to claim 6, wherein in the selection screen, one of the valid status or the invalid status of the first input information is selected in accordance with the first input information.

8. The image forming apparatus according to claim 6, wherein in the selection screen, one of the valid status or the invalid status of the first input information is selected in accordance with the second input information.

9. An image forming apparatus comprising:
an image forming portion configured to form an image on a recording medium;
a display portion configured to display information regarding image forming with the image forming portion;
a memory storing instructions; and
a controller, which executes the instructions, configured to: detect a position of an instruction portion in contact with a surface of the display portion and generate first input information indicating the detected position of the instruction portion; and
detect a position of the instruction portion at a location a predetermined distance away from the surface in a direction orthogonal to the surface and generate second input information indicating the detected position; and
wherein the display portion displays a selection screen for selecting valid status or invalid status of the second input information and in a case that the valid status of the second input information is selected, generation of the first input information is made invalid.

10. The image forming apparatus according to claim 9, wherein in a case that the invalid status of the second input information is selected, generation of the first input information is made valid.

11. The image forming apparatus according to claim 9, wherein in the selection screen, one of the valid status or the invalid status of the first input information is selected in accordance with the first input information.

12. The image forming apparatus according to claim 9, wherein in the selection screen, one of the valid status or the invalid status of the first input information is selected in accordance with the second input information.

* * * * *